United States Patent [19]
Steier

[11] 4,172,865
[45] Oct. 30, 1979

[54] AIR FILTRATION DEVICE

[76] Inventor: Ernest Steier, 3117-B N. Orchard, Chicago, Ill. 60657

[21] Appl. No.: 813,487

[22] Filed: Jul. 7, 1977

[51] Int. Cl.² .............................................. B01D 47/02
[52] U.S. Cl. ....................................... 261/62; 55/246; 55/250; 55/259; 55/418; 55/472; 261/105; 261/119 R
[58] Field of Search .................. 55/226, 227, 246, 259, 55/248–250, 418, 472; 261/62, 105, 119 R, DIG. 54

[56] References Cited

U.S. PATENT DOCUMENTS

| | | | |
|---|---|---|---|
| 1,073,621 | 9/1913 | Murray | 261/DIG. 54 X |
| 1,409,593 | 3/1922 | Schram | 55/227 X |
| 1,926,433 | 9/1933 | Cartmell | 55/250 |
| 1,994,766 | 3/1935 | Heglar | 55/246 X |
| 2,491,645 | 12/1949 | Clark et al. | 261/119 R X |
| 3,336,733 | 8/1967 | Wisting | 261/DIG. 54 X |
| 3,385,032 | 5/1968 | Crabbe | 55/249 |
| 3,581,474 | 6/1971 | Kent | 55/226 |
| 3,668,840 | 6/1972 | Pierick | 55/246 X |
| 3,686,833 | 8/1972 | Rush | 55/250 X |
| 3,702,048 | 11/1972 | Howick | 55/418 X |
| 3,856,487 | 12/1974 | Perez | 261/DIG. 54 X |
| 4,006,674 | 2/1977 | Culver | 55/246 X |

FOREIGN PATENT DOCUMENTS

| | | | |
|---|---|---|---|
| 665592 | 9/1938 | Fed. Rep. of Germany | 55/227 |
| 58659 | 1/1912 | Switzerland | 55/249 |

*Primary Examiner*—Frank W. Lutter
*Assistant Examiner*—Kathleen J. Prunner

[57] ABSTRACT

A room air cleaner draws ambient air beneath a freely swinging baffle suspended above a liquid bath. As the air passes beneath the baffle, it is directed toward the surface of the bath. The momentum of the solid particles within the ambient air carries the particles into the bath where they are trapped and maintained. The air is then drawn through a filter element and subsequently exhausted into the room. An anti-splash screen prevents entrained liquid from being exhausted along with the stream of filtered air, while a separate reservoir together with a float valve mechanism may be utilized to maintain the liquid bath at a constant level, offsetting any liquid evaporation.

3 Claims, 3 Drawing Figures

AIR FILTRATION DEVICE

This invention relates to air cleaners and more particularly to a cleaner having a liquid bath and a movable baffle directing the flow of air to contact the surface of the bath. Airborne impurities enter the bath and are retained therein by their own momentum; the air flow then passes through a filter element and is exhausted from the air cleaner in a substantially particle-free stream.

Airborne particles, such as dust or pollen, are responsible for a great deal of discomfort and inconvenience ranging from the throes of the chronic hay fever sufferer to the frustration of the homemaker in attempting to keep a house or apartment free of dust. Devices for the removal of particulate matter from the air are well-known, but for the most part are complex in construction, expensive to purchase or operate, and limited in utility. Attempts to limit the circulation of airborne particles have centered upon such devices as electrostatic screens for forced air heating systems, a wide variety of furnace or fan filters, filter media placed over the air intakes of window air conditioners, and room dehumidifier units which remove particles from the air incidentally while removing moisture from the air. Such devices, while providing limited utility as traps for airborne particles, are either inherently expensive, operate only when a central source for air circulation is operating, or perform such removal incidental to a separate primary operation. Accordingly, the present invention has the following objects:

To provide air cleaners utilizing a liquid bath to trap airborne particulate matter;

To provide such air cleaners in forms easily transportable from room to room;

To provide such air cleaners in forms utilizing both a liquid bath and mechanical filter to trap airborne particles;

To provide such air cleaners in forms utilizing a freely swinging baffle to direct the incoming flow of air;

To provide such air cleaners with internal baffles to prevent the entraining of liquid with the exhaust air stream;

To provide such air cleaners in forms conveniently and easily transportable from place to place;

To provide such air cleaners with apparatus to maintain a constant liquid bath level; and To provide such air cleaners in forms easily emptied and cleaned.

These and further objects will become more apparent upon consideration of the accompanying drawings in which.

Figure 1:
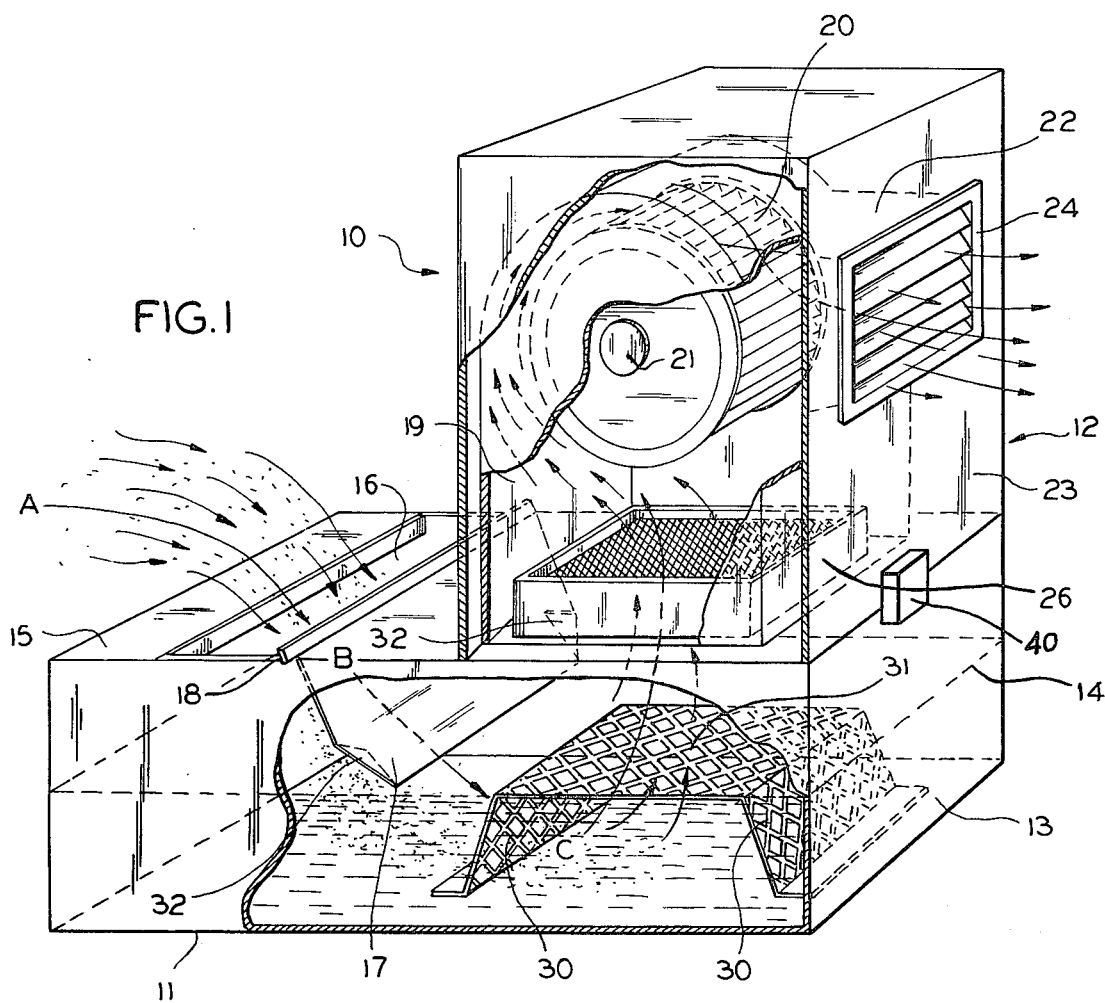
FIG. 1 is a perspective view partially in section of the subject air cleaner.

Consistent with the foregoing objects, an air cleaner 10 is provided with an air inlet 16, and air outlet 24, with liquid bath 13 disposed intermediate said inlet and outlet as shown in FIG. 1. Pivoted baffle 17, disposed at said inlet 16, intermediate said inlet and said bath, as shown in FIG. 1, directs the airstream, initiated by blower 20, to contact liquid bath 13, thence to be drawn through filter 26 and to be exhausted through outlet 24. Splash screen 29 prevents turbulence in liquid bath 13, while valve 36 and float 35 keep liquid bath 13 at a constant level 14 to offset evaporation losses.

Referring now to FIG. 1 the numeral 10 indicates generally an air cleaner having a lower liquid bath housing 11 and an upper blower housing 12. While any suitable liquid may be utilized as a liquid bath, it is anticipated that water will be the most commonly used liquid. Liquid bath 13 is maintained within housing 11, at level 14 for reasons which will be discussed hereinbelow. While the mechanical components of air cleaner 10 are herein illustrated, it is to be understood that air cleaner 10 may be constructed in a wide variety of sizes and capacities as air-handling demands require, and may be built as large, permanently installed units, as well as smaller, portable, "table top" units.

Bath housing 11, in this embodiment, has an upper face 15 within which is formed air intake 16, herein presented as a rectangular port. Swinging air baffle 17 is suspended across the width of intake 16 and is supported by baffle extensions 18 and 19. In this manner, baffle 17 is free to swing in a back-and-forth manner as conditions of air flow dictate.

Upper blower housing 12 includes a blower fan 20 herein presented as a squirrel cage type fan mounted on blower motor 21. Outlet duct 22 extends from blower 20 to front face 23 of housing 12 terminating in louvered exhaust port 24, the louvers of which may be adjusted to direct the flow of cleaned air.

Figure 2:
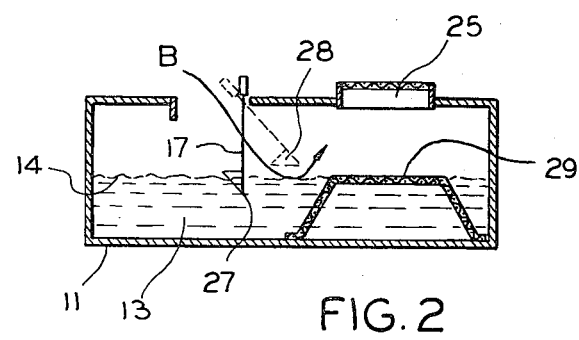
FIG. 2 is a partial side elevation illustrating the lower housing detached from the upper housing, and the baffle in the rest and in operation positions.

Lower bath housing 11 and upper blower housing 12 communicate at passageway 25, best seen in FIG. 2. Filter screen 26, seen in FIG. 1, is positioned to completely cover passageway 25, thereby adding an additional filtering medium for air cleaner 10.

The operation of air cleaner 10 may be described as follows. Liquid bath housing 11 is filled with liquid 13 to a level 14 sufficient to submerge the lower edge 27 of baffle 17, as best seen in FIG. 2. Blower motor 21 is then activated to rotate squirrel cage blower 20, thereby drawing air into liquid bath housing 11 through port 16 along path A as seen in FIG. 1. As blower 20 achieves a sufficient air stream velocity, baffle 17 is displaced upward to leave a space, or duct 28 as seen in FIG. 2, and air passes thereunder along path B. A "duct" is thereby formed by the lower edge 27 of baffle 17, the surface of liquid bath 13, and sides 11a and 11b of lower liquid bath housing 11. Said "duct" will vary in cross-sectional area as the height of edge 27 above bath 13 is varied depending upon level 14 of bath 13 and the strength of airstream A. The air stream then continues along path C and is drawn upward through passageway 25 and through filter 26, disposed between level 14 and outlet 24, to be drawn around blower 20 as shown by path D and thence exhausted through exhaust port 24. The particulate matter present in this air stream, however, is trapped by liquid bath 13 in the following manner. As the air stream passes beneath and around baffle 17 it undergoes a sharp change in direction. The particulate matter contained in the air stream, however, through force of its own momentum, continues downward to strike the surface of liquid bath 13 and is thereby trapped. Each individual airborne particle thus becomes a victim of its own momentum. Filter medium 26 is provided as an additional safeguard to insure that extremely small particles which may not enter bath 13, or particles somehow deflected from the surface of liquid bath 13, do not reach exhaust port 24.

In order to operate most efficiently, liquid bath 13 must not become turbulent. Such turbulence would contribute to the entrainment of liquid in the exhaust air stream. Entrainment of liquid in the exhaust air stream would not only result in an exhaust stream of wet air, it would also entail an accelerated loss of liquid from liquid bath 13 and would necessitate frequent refilling of liquid bath housing 11. It is desirable, for air cleaning purposes, that losses such as by evaporation from liquid bath 13 be minimized. This is effectively accomplished by completely enclosing lower housing 11 save for port 16 which, in this embodiment, is kept to a narrow opening when compared to the overall length of liquid bath housing 11. To further insure that liquid from bath 13 does not become entrained in airstream C, which would accelerate liquid loss, splash screen 29 is provided and is positioned in lower housing 11. In this embodiment, splash screen 29 is positioned beneath passageway 25 and filter 26, and comprises a "step" having a pair of sides 30a and 30b depending from a flat base 31 formed of a wire or plastic mesh material, or a perforated metal material and is situated such that flat portion 31 is positioned at or slightly below level 14 of liquid bath 13.

Splash screen 29 may also be formed from perforated sheet metal, similar to that commonly used in commercially available filters. Use of splash screen 29 minimizes agitation of liquid bath 13, particularly as initiated by motor 21. By maintaining flat portion 31 at or near to liquid level 14, turbulence and consequent splashing are dissipated before reaching filter 26 or blower 20. Legs 30a and 30b, extending transversely to lower housing 11, also limit any back-and-forth movement of liquid bath 13.

As a further step in order to minimize turbulence in liquid bath 13, baffle 17 is shaped and designed to be maintained above bath level 14 so long as a steady air stream is passing through port 16 to be eventually exhausted through exhaust port 24. To aid in this stability, at least one air foil is formed along the lower edge of baffle 17 and, as best seen in FIG. 1, air foils 32 are formed at the corners of the lower edge 27 of a generally rectangular baffle or flap 17, to stabilize baffle 17 and to direct the incoming airstream toward the center of the liquid bath. In the preferred embodiment shown, airfoils 32 are formed by "folding over" the corners of baffle 17 to extend inwardly and downwardly toward bath 13 when baffle 17 is suspended in airstream A. Thus, baffle 17 acts effectively as a guide to direct the airstream into contact with liquid bath 13, with the height to which baffle 17 is raised during operation dependent upon the rate of air flow through cleaner 10.

While not illustrated specifically herein, it is contemplated that blower motor 21 may be provided with controls well known in the art to manually or automatically allow the setting of more than one blower speed to achieve different flow rates of air. Baffle 17 would thus automatically adjust no matter what the air speed selected.

Figure 3:
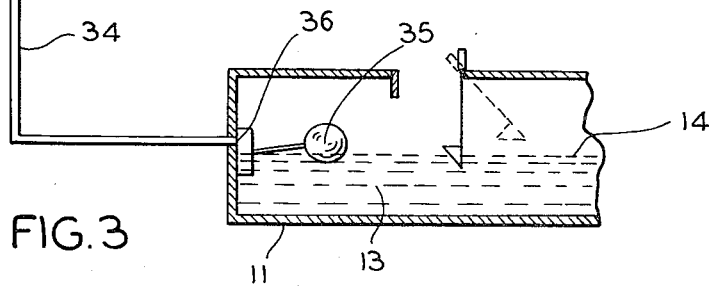
FIG 3 is a partial side sectional view illustrating the lower housing detached from the upper housing, and the use of an external reservoir to maintain a constant level in the liquid bath.

It is thus important to maintain as nearly as possible the level of liquid bath 13. Too high a level would prevent baffle 17 from clearing liquid bath 13 and may produce turbulence, while too low a level would allow air to pass under baffle 17 without contacting the surface of bath 13. To maintain such a constant level, an auxiliary reservoir 33 may be provided, as illustrated in FIG. 3. Reservoir 33 would communicate with lower housing 11 through conduit 34, and would include a float 35 and valve mechanism 36 to regulate level 14 of bath 13. As level 14 drops, either by evaporation or otherwise, float 35 would be lowered, thereby opening valve mechanism 36 to allow liquid from reservoir 33 to enter lower housing 11. When level 14 rises sufficiently, float 35 would raise to interrupt any further flow of liquid into bath 13. In this manner, a liquid bath level may be maintained as constant and a user need only fill reservoir 33 from time to time, rather than being required to to check level 14 daily and add small amounts of liquid to bring level 14 up to the desired height. Reservoir 33 may be included as an integral element of air cleaner 10, may be a separate, add-on type accessory, or may be modified to allow permanent attachment of air cleaner 10 to a liquid supply as, for example, to a water line. Such an arrangement is feasible when air cleaner 10 is situated or installed in a permanent location. Use of an actual reservoir would no longer be required; valve mechanism 36 may be used to interrupt the liquid supply line directly, much in the same manner that a furnace-mounted humidifier maintains an adequate liquid level when connected to a constant source of liquid.

Periodic cleaning of liquid bath 13 is required whenever a sufficient buildup of trapped particles occurs. To facilitate such cleaning, upper housing 12 may, in one embodiment, be detachable from lower housing 11, as seen in FIGS. 2 and 3, allowing removal of filter 26 for cleaning, and allowing liquid bath 13 to be emptied and replaced. For a larger or more permanently installed unit, a drain may be provided to enable lower housing 11 to be drained without requiring disassembly.

Air cleaner 10 may thus be used independently of forced-air heating or cooling systems to provide a stream of clean air wherever required. Adaptation of the unit to be used in conjunction with a forced-air system would be difficult; air cleaning would then, however, be limited to those times during which the system is actually operating. Use of air cleaner 10 as a separate, independent unit enables constant air cleaning even in the absence of a source of circulatory air.

While the foregoing has been described as a preferred embodiment, it is to be understood that this embodiment is presented by way of example only. It is expected that others skilled in the art will perceive variations which, while differing from the foregoing, do not depart from the spirit and scope of the invention as claimed.

I claim:

1. Apparatus for cleaning air by removing particulate matter therefrom, said apparatus being of the type having a housing with an air inlet and an air outlet, a fan for moving said air in an air stream entering at said inlet, passing through said housing, and exiting at said outlet, and a liquid bath positioned within said housing intermediate said inlet and said outlet, said apparatus comprising:

means for directing said air stream to blow upon said liquid bath, thereby trapping said particulate matter in said bath, while said air stream continues on toward said outlet, said directing means being positioned at said inlet intermediate said inlet and said liquid bath, said directing means being pivoted to raise or lower with changes in the velocity of said air stream through said housing, said directing means being formed as a single, impervious, baffle, said baffle having a lower edge,
said lower edge having at least one airfoil formed therealong to stabilize said baffle in said air stream.

2. The apparatus as recited in claim 1 wherein said baffle is formed as a generally rectangular flap and said airfoil is formed by folding over a corner of said flap.

3. The apparatus as recited in claim 1 wherein said apparatus further includes means to limit splashing of liquid in said liquid bath,
said splash-limiting means having a base and a pair of sides depending therefrom,
said base being positioned proximate to the level of said liquid bath,
said base and said sides being fashioned from perforated material.

* * * * *